US006938154B1

(12) United States Patent
Berson et al.

(10) Patent No.: US 6,938,154 B1
(45) Date of Patent: Aug. 30, 2005

(54) SYSTEM, METHOD AND ARTICLE OF MANUFACTURE FOR A CRYPTOGRAPHIC KEY INFRASTRUCTURE FOR NETWORKED DEVICES

(75) Inventors: Thomas A. Berson, Palo Alto, CA (US); R. Drews Dean, Cupertino, CA (US); Matthew K. Franklin, Palo Alto, CA (US); Teresa F. Lunt, Palo Alto, CA (US); Diana K. Smetters, Burlingame, CA (US)

(73) Assignee: Xerox Corporation, Stamford, CT (US)

( * ) Notice: Subject to any disclaimer, the term of this patent is extended or adjusted under 35 U.S.C. 154(b) by 917 days.

(21) Appl. No.: 09/596,948

(22) Filed: Jun. 19, 2000

(51) Int. Cl.[7] .............................................. H04L 9/00
(52) U.S. Cl. ...................... 713/156; 713/155; 713/168; 713/169; 713/175
(58) Field of Search ................................ 713/156, 155, 713/168–171, 175

(56) References Cited

U.S. PATENT DOCUMENTS

| | | | |
|---|---|---|---|
| 5,673,316 A | 9/1997 | Auerbach et al. ............... 380/4 |
| 5,790,664 A | 8/1998 | Coley et al. ..................... 380/4 |
| 5,802,176 A | 9/1998 | Audebert ..................... 380/23 |
| 5,862,220 A | 1/1999 | Perlman ....................... 380/21 |
| 5,956,404 A | 9/1999 | Schneier et al. .............. 380/25 |
| 5,978,484 A | 11/1999 | Apperson et al. ............. 380/25 |
| 5,991,399 A | 11/1999 | Graunke et al. ............... 380/4 |
| 5,995,625 A | 11/1999 | Sudia et al. ................... 380/25 |
| 6,055,508 A | 4/2000 | Naor et al. .................... 705/11 |
| 6,078,663 A | 6/2000 | Yamamoto ..................... 380/9 |
| 6,105,131 A * | 8/2000 | Carroll ....................... 713/155 |
| 6,269,157 B1 | 7/2001 | Coyle ......................... 379/114 |
| 6,304,915 B1 | 10/2001 | Nguyen et al. ............... 709/250 |
| 6,314,521 B1 * | 11/2001 | Debry ......................... 713/201 |

FOREIGN PATENT DOCUMENTS

| | | |
|---|---|---|
| EP | 0 736 827 A2 | 10/1996 |
| WO | WO 98/42098 | 9/1998 |
| WO | WO 98/52316 | 11/1998 |

* cited by examiner

Primary Examiner—Gilberto Barron, Jr.
Assistant Examiner—Grigory Gurshman (57) ABSTRACT

A system, method and article of manufacture are provided for secure operation of a network device. A digital certificate is assigned to a network user. A command for operation of a network device and the digital certificate are received from the network user. A cryptographic key stored in the network device is utilized to authenticate the digital certificate of the network user. Operation of the network device is enabled if the digital certificate of the network user is authenticated. According to another aspect of the present invention, a system, method and article of manufacture are provided for secure identification of a network device. A digital certificate is assigned to a network device. A command for operation of the network device is received from a network user. The digital certificate is sent to the network user. The network user utilizes a cryptographic key to authenticate the digital certificate of the network device. Operation of the network device is enabled if the digital certificate of the network device is authenticated. In another embodiment of the present invention, a system, method and article of manufacture are provided for secure management of a network device. Policy information and/or a computational protocol are associated with a command for the network device. The policy information and/or computational protocols are encrypted, sent to the network device, and decrypted. The network device utilizing the policy information and/or computational protocols processes the command.

16 Claims, 5 Drawing Sheets

SYSTEM, METHOD AND ARTICLE OF MANUFACTURE FOR A CRYPTOGRAPHIC KEY INFRASTRUCTURE FOR NETWORKED DEVICES

FIELD OF THE INVENTION

The present invention relates generally to network communication with distributed devices and, more particularly, to secure identification, management and operation of network devices.

BACKGROUND OF THE INVENTION

Devices, such as printers, are increasingly being provided with network interfaces. Though such interfaces may have been conceived initially for the delivery of data, once they are present they can be used for a tremendous and increasing variety of management functions. Allowing devices to be managed and operated remotely has tremendous, and as yet unacknowledged, security implications.

At present, security for remote management and use of network devices is achieved by simple password-based security programs. For example, the Web JetAdmin software by Hewlett Packard, that allows remote management of many of Hewlett Packard's printers, uses a number of passwords to protect administrative functions. However, password-based security systems are easy to defeat, and a password often allows access to every device on the network.

Internet Protocol Security (IPSec) is a developing standard for security at the network or packet processing layer of network communication. Earlier security approaches have inserted security at the application layer of the communications model. IPSec can be used to implement virtual private networks and for remote user access through dial-up connection to private networks. A big advantage of IPSec is that security arrangements can be handled without requiring changes to individual user computers. Cisco has been a leader in proposing IPSec as a standard (or combination of standards and technologies) and has included support for it in its network routers.

IPSec provides two choices of security service: Authentication Header (AH), which essentially allows authentication of the sender of data, and Encapsulating Security Payload (ESP), which supports both authentication of the sender and encryption of data as well. The specific information associated with each of these services is inserted into the packet in a header that follows the IP packet header. Separate key protocols can be selected, such as the ISAKMP/Oakley protocol.

Digital certificates and encryption/decryption keys can be given to devices for security purposes. The IPSec security protocol (Request for Comments (RFC) 2401, 2408) has a concept of certifying the endpoints of IP-based communications (e.g. routers, gateways, and personal computers). Such devices use their certificates in key exchange protocols to allow them to encrypt and authenticate Internet Protocol (IP) packets sent between them. However, other than this narrow application, the devices are treated more or less as passive certificate containers.

The new Internet Printing Protocol (IPP), designed to allow access to printers over the Internet, takes two very basic approaches to security (RFC 2566). First, it suggests the optional use of Secure Sockets Layer (SSL) to connect to an IPP object (printer/print server), and second, it allows the incorporation of a non-human-readable name in the field used to identify the sender of a job. IPP objects which participate in SSL/TLS can use public key cryptography and digital certificates to do so. For example, the IPP objects will use SSL to authenticate the server end of a connection using a digital certificate.

The prior art also refers to the idea of securing software downloads by signing downloadable code with a key trusted by the code receiver. Examples are Microsoft's Authenticode and related work described in U.S. Pat. No. 5,978,484. See also U.S. Pat. No. 5,825,877 assigned to IBM. Such systems have been applied to firmware upgrades. However, this still allows anyone with network access to order the download. What is needed is a process of identifying the administrator ordering the download before allowing the upgrade to proceed.

SUMMARY OF THE INVENTION

These security needs can be met by opening up the concept of Public Key Infrastructure (PKI) to a degree beyond that previously suggested—to give every networked device, such as printers, scanners, or copiers, one or more cryptographic key pairs and digital certificates. This gives each such device a cryptographic "identity" (or possibly more than one, in the case of applications which require degrees of identity protection).

This allows such devices to participate securely in protocols whereby a device can authenticate itself to a remote user or administrator, and such a user or administrator can authenticate themselves to the device. It also allows such a device to easily add basic privacy and integrity services to its data transmission operations. Such devices can cryptographically enforce usage policies. Having such an infrastructure in place for printers, copiers, and scanners makes it very simple to implement a myriad of policy-based security functions.

Accordingly, a system, method and article of manufacture are provided for secure operation of a network device, such as a printer, a copier, a scanner, or a facsimile machine. A digital certificate is assigned to a network user, which can be a person, another network device, a remote device, or anything else capable of sending information to the network device. A command for operation of a network device and the digital certificate are received from the network user. A cryptographic key stored in the network device is utilized to authenticate the digital certificate of the network user. Operation of the network device is enabled if the digital certificate of the network user is authenticated.

In one aspect of the present invention, operation of the network device is enabled according to a usage policy associated with the network user. In another aspect of the present invention, the network user approves a maintenance interaction between the network device and a maintenance administrator.

As an option, the command for operation of the network device is encrypted. The cryptographic key is utilized to decrypt the command for operation. In yet another aspect of the present invention, electronic payment is received for paying for operation of the network device.

According to another aspect of the present invention, a system, method and article of manufacture are provided for secure identification of a network device. A digital certificate is assigned to a network device. A command for operation of the network device is received from a network user. The digital certificate is sent to the network user. The network user utilizes a cryptographic key to authenticate the digital certificate of the network device. Operation of the network device is enabled if the digital certificate of the network device is authenticated.

As an option, secure communication is established between the network device and an administrator of the device for a maintenance function and/or a billing function.

For example, a software update for the network device can be received from the administrator. In an aspect of the present invention, a unique digital certificate is assigned to a second network device, where the command for operation of the network device is re-routed to the second network device based on at least one of attributes of the network devices and a policy.

According to a further aspect of the present invention, a method is provided for secure management of a network device. Policy information and/or a computational protocol are associated with a command for the network device. The policy information and/or computational protocols are encrypted, sent to the network device, and decrypted. The command is processed by the network device utilizing the policy information and/or computational protocols.

BRIEF DESCRIPTION OF THE DRAWINGS

The foregoing and other objects, aspects and advantages are better understood from the following detailed description of a preferred embodiment of the invention with reference to the drawings, in which.

DESCRIPTION OF THE PREFERRED EMBODIMENTS

Figure 1:
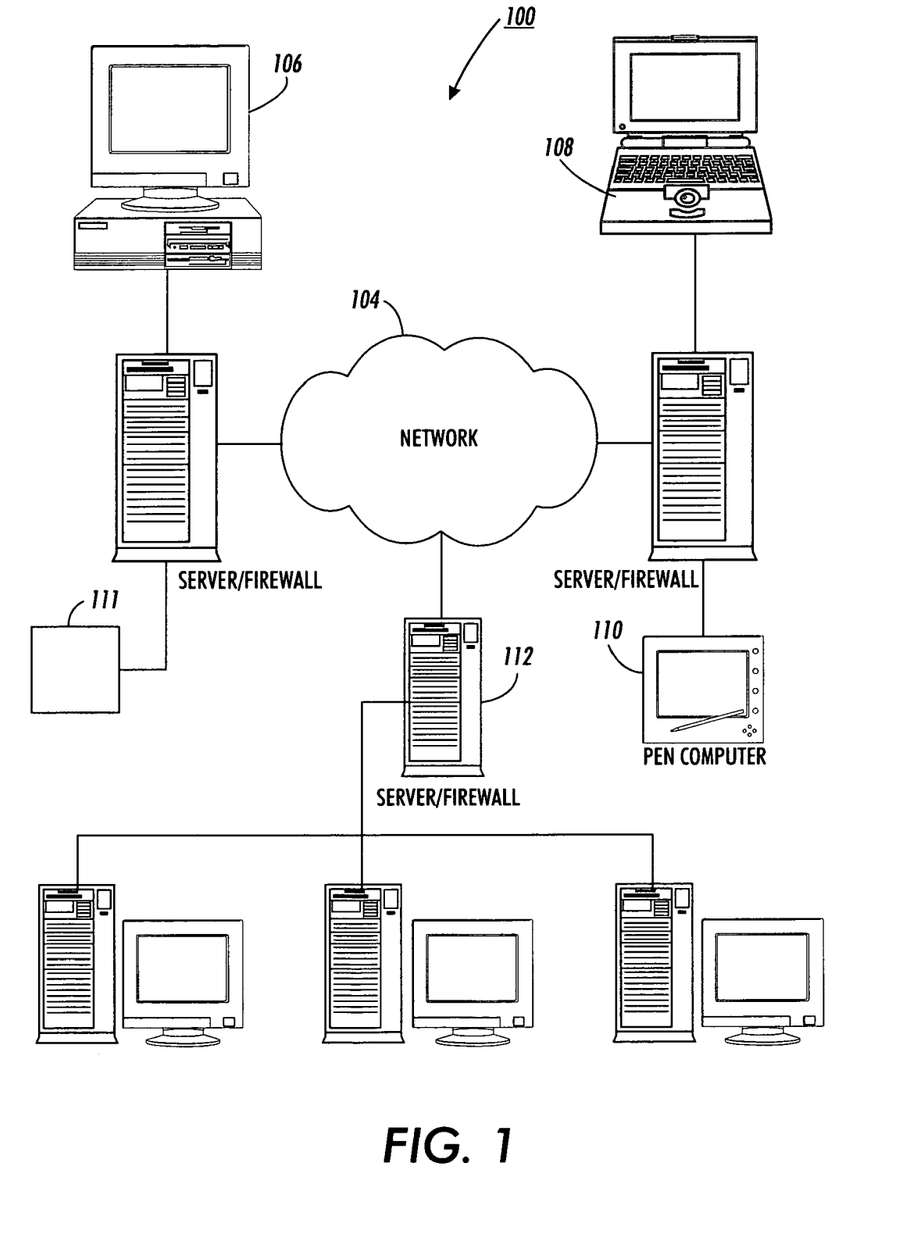
FIG. 1 illustrates an illustrative system with a plurality of components in accordance with one embodiment of the present invention.

FIG. 1 illustrates an exemplary system 100 with a plurality of components 102 in accordance with one embodiment of the present invention. As shown, such components include a network 104 which take any form including, but not limited to a local area network, a wide area network such as the Internet, etc. Coupled to the network 104 is a plurality of computers which may take the form of desktop computers 106, lap-top computers 108, hand-held computers 110, or any other type of computing hardware/software 111. As an option, the various computers may be connected to the network 104 by way of a server 112 which may be equipped with a firewall for security purposes. It should be noted that any other type of hardware or software may be included in the system and be considered a component thereof.

Figure 2:
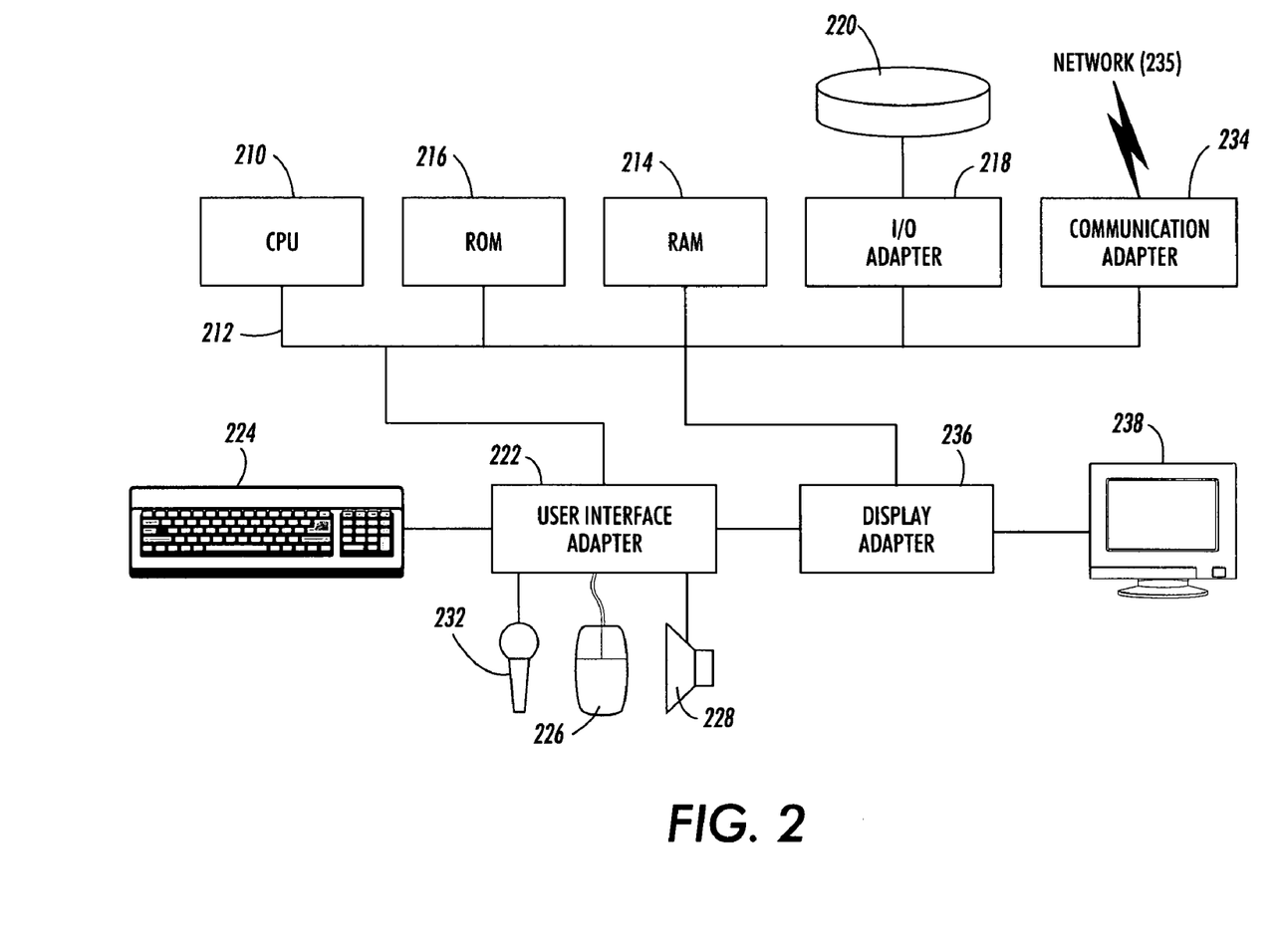
FIG. 2 illustrates a representative hardware environment in accordance with one embodiment of the present invention.

A representative hardware environment associated with the various components of FIG. 1 is depicted in FIG. 2. In the present description, the various sub-components of each of the components may also be considered components of the system. For example, particular software modules executed on any component of the system may also be considered components of the system. FIG. 2 illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238.

In accordance with a preferred embodiment, generally available hardware is used with customized software. However, one of ordinary skill in the art will readily comprehend that hardware could be utilized to customize or optimize various aspects without departing from the spirit and scope of the claims. A Sun Ultra-10 workstation running Solaris 7 with an Atalla AXL200 accelerator is utilized in accordance with a preferred embodiment. The AXL200 is rated at 236 1024-bit private key RSA operations per second.

Figure 3:
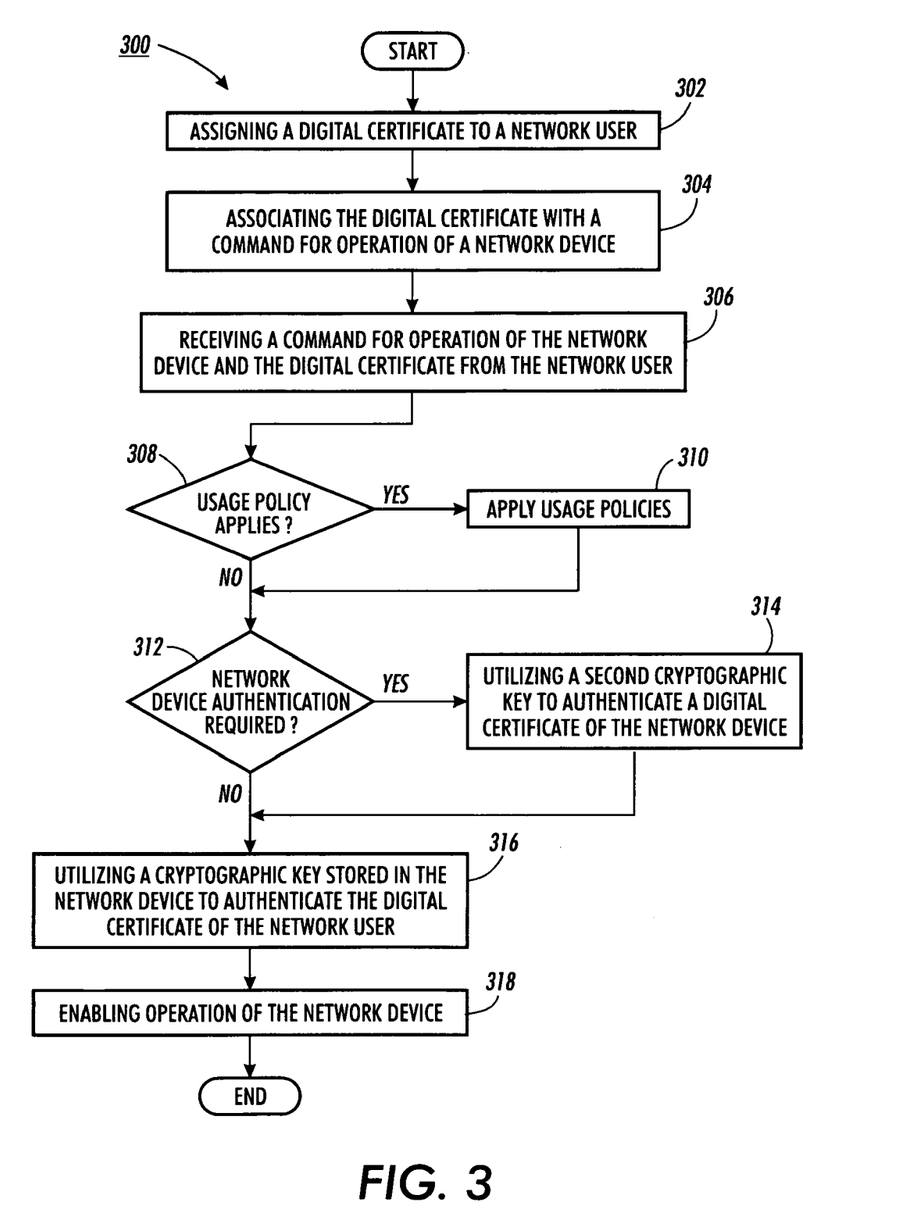
FIG. 3 is a flowchart illustrating a process for secure operation of a network device according to one embodiment of the present invention.

FIG. 3 illustrates a process 300 for secure operation of a network device, such as a printer, a copier, a scanner, or a facsimile machine, for example. In operation 302, a digital certificate is assigned to a network user, which can be a person, another network device, a remote device, or anything else capable of sending information to the network device. The digital certificate is associated with a command for operation of a network device in operation 304. The command and the digital certificate are received from the network user in operation 306.

In operation 308 of FIG. 3, it is determined whether any usage policy applies to the user or to the network device. If one or more usage policies apply, they are applied in operation 310 and the process continues. If no usage policy applies, the process continues.

In operation 312, a determination is made as to whether authentication of the network device is required. If so, in operation 314, a second cryptographic key is used to authenticate a digital certificate of the network device. In operation 316, a cryptographic key stored in the network device is utilized to authenticate the digital certificate of the network user. Operation of the network device is enabled in operation 318 if the digital certificate of the network user is authenticated.

This allows such devices to participate securely in protocols whereby a device can authenticate itself to a remote user or administrator, and such a user or administrator could authenticate themselves to the device. It also allows such a device to easily add basic privacy and integrity services to its data transmission operations. Such devices can cryptographically enforce usage policies. Having such an infrastructure in place for printers, copiers, and scanners makes it very simple to implement a myriad of policy-based security functions.

In one embodiment of the present invention, operation of the network device is enabled according to a usage policy associated with the network user. In another embodiment of the present invention, the network user approves a maintenance interaction between the network device and a maintenance administrator. As an option, the command for operation of the network device is encrypted. The cryptographic key is utilized to decrypt the command for operation. In yet another embodiment of the present invention, electronic payment is received for paying for operation of the network device.

Figure 4:
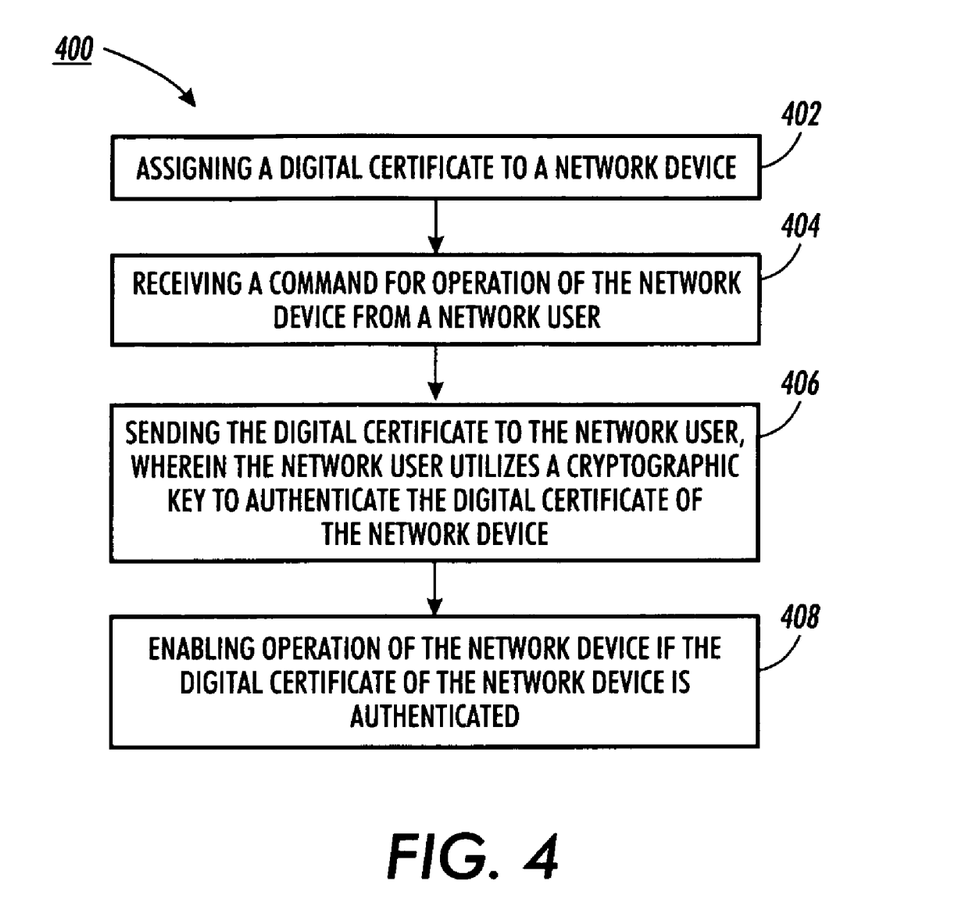
FIG. 4 is a flowchart of a process: for secure identification of a network device in accordance with an embodiment of the present invention.

FIG. 4 is a flowchart of a process 400 for secure identification of a network device. A digital certificate is assigned to a network device in operation 402. A command for operation of the network device is received from a network user in operation 404. The digital certificate is sent to the network user in operation 406. The network user utilizes a cryptographic key to authenticate the digital certificate of the network device. Operation of the network device is enabled in operation 408 if the digital certificate of the network device is authenticated.

As an option, secure communication is established between the network device and an administrator of the device for a maintenance function and/or a billing function. For example, a software update for the network device can be received from the administrator. In another example, the billing function sends usage information to the administrator and/or manufacturer based on the commands sent to the device by the user. The user would then be billed or otherwise made accountable for the cost of use. In an embodiment of the present invention, a unique digital certificate is assigned to a second network device, wherein the command for operation of the network device may be re-routed to the second network device based on at least one of attributes of the network devices and a policy.

Figure 5:
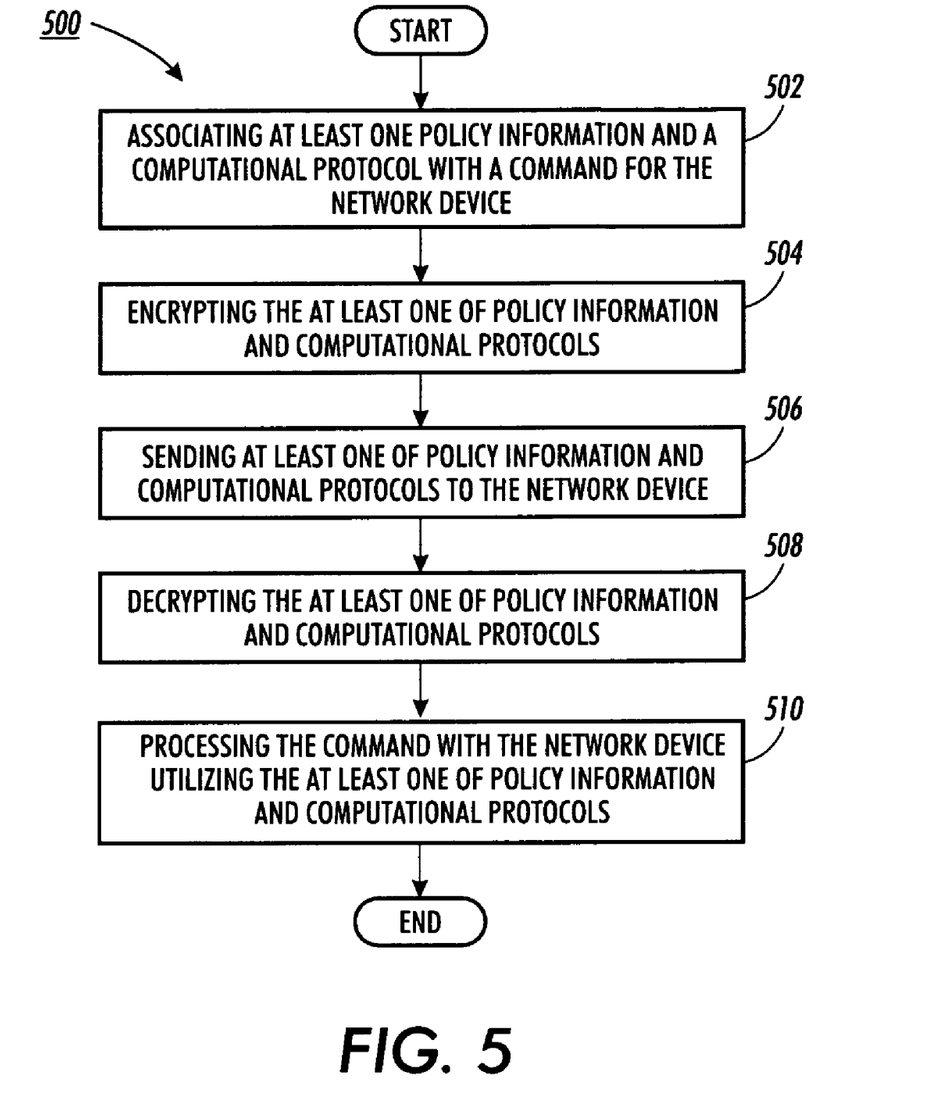
FIG. 5 is a flow diagram of a process for secure management of a network device according to one embodiment of the present invention.

FIG. 5 is a flow diagram of a process 500 for secure management of a network device according to one embodiment of the present invention. In operation 502, policy information and/or a computational protocol are associated with a command for the network device. The policy information and/or computational protocols are encrypted, sent to the network device, and decrypted in operations 504, 506, and 508, respectively. In operation 510, the command is processed by the network device utilizing the policy information and/or computational protocols.

Base Functionality and Manufacturing Use

Base cryptographic functionality can be provided in device software, in special-purpose hardware (ASICs), or by use of networked cryptographic accelerators (Cryptoservers). Each device is able to manage one or more key pairs and digital certificates, and store certain keys "trusted" to issue certificates to others. Cryptographic algorithms can be chosen based on the device's abilities and the application requirements.

At manufacture each device can generate (or be provided with) a public-private key pair. This key pair may be associated with the device's serial number and manufacturer's identity and public key via a certificate. The purchaser might add other certificates or keys to the device.

Such a manufacturer-issued certificate, in combination with a well-known network address for the manufacturer allows such a device to establish secure communication with its manufacturer for maintenance and billing. This does not require any configuration on the part of the device's purchaser. This also allows secure update of device firmware. For example, such updates could only be accepted if digitally signed by the device's manufacturer. By carefully restricting use of the keys allowed to sign firmware upgrades, the manufacturer can enforce its own business policies. Accordingly, only firmware successfully completing an acceptance process would be so signed and hence installable.

With this basic infrastructure (cryptographic capability, device keys, and device and issuer certificates) in place, an enormous variety of additional applications are enabled, including secure printing and remote auditing and monitoring of systems.

Customer Use

After a customer has purchased a printer or other device, that customer can provide the device with a certificate issued by the customer's Certificate Authority (CA).

For example, this allows the device to securely interoperate with other devices on the customer's network, and allows the customer to further control the device's function (e.g. only that customer can remotely administer the device, and that customer must cryptographically approve the device's maintenance interactions with the manufacturer). If all devices owned by the same customer contain certificates to that effect, they can identify and interact with each other in a secure fashion. Faxes can be securely sent to other locations, by encrypting them at origin with the key of the destination fax machine. Printers can pass jobs off to machines down the hall when they fail. Secure forms of network discovery can allow users to find devices, and devices to find each other without risk of malicious impersonation. Roaming users can be immediately authorized to use devices at other corporate sites.

Policy-Based Security Applications

Network devices such as printers can be configured to enforce security (or other) policies. A few basic examples include:

1) Only documents signed by users with certificates containing the appropriate attributes could be printed on company check stock.
2) Users could encrypt a document in such a way that only a particular printer could decrypt and print it.
3) A user could check attributes of a printer via certificates—is it in a secure facility, is it loaded with a particular kind of secure ink, etc, or specify that a document can only be printed by a printer with certain features, and allow the routing system to find such a printer.
4) A user could send a document encrypted under a particular key to a printer, but only provide that key to the printer to allow it to decrypt and print once the user was physically in the room to obtain the document.
5) A printer could use attributes of a user's digital signature to watermark their printed documents.
6) Printers with secure auditing capabilities could log everything they print, or all management information they send over the network.
7) A printer with the cryptographic ability to interpret secure content protection systems could print documents only in ways corresponding to their publisher's requirements. Such a printer could enable end-to-end security in content protection applications—e.g. controlling who had the ability to decrypt and print health records, etc.
8) A printer capable of engaging in electronic cash protocols could accept digital cash along with a document over the network to pay for print services. It would be easy to decouple the time a document is sent and the time it is processed by a service provider, and in between allow that provider to offer a secure escrow service for encrypted documents.
9) Such a printer could easily offer secure printing services like electronic stamps, without requiring extra hardware or setup.

It is extremely difficult to implement or enforce such fine-grained policy-based applications without cryptographically enabling the end devices. Given limited user interface capabilities, configuring such policies cannot be done directly on the device itself. The large number of devices, which might have to interpret flexible and changing policies, means installing the policies in the devices would be a management nightmare. It would be much easier to send policy and credential information along with the documents to which it applies; and to do this securely requires that it be cryptographically protected and bound to the particular document in question. Building basic cryptographic operations, and possibly an engine for interpreting PKI-based authentication logics (e.g. SPKI) into a printer or other device allows that device to interpret and enforce novel policies as they come along. This is a tremendously flexible approach—it allows new applications or management functions to be easily, rapidly, securely and cheaply implemented.

Putting cryptographic capabilities into primary devices, and having them participate in a PKI, provides a substrate on top of which a huge number of policy-based secure document services can be easily implemented. A model where all networked devices participate in one or more PKIs allows these services to extend to secure interaction between printers and copiers and devices such as cellular phones, networked storage servers, web services, etc.

Key and Encryption

In a public key encryption scheme, cryptographic keys occur in pairs: one of the pair is a private key that is kept confidential, and the other of the pair is a public key that can be made available to anyone. When data is encrypted using one of the keys (either the public key or the private key), the other key must be used to decrypt the data. For example, resource A encrypts data using a private asymmetric cryptographic key belonging to A. Resource A makes the corresponding public asymmetric cryptographic key available publicly. The only key that can properly decrypt the data is the public key corresponding to the private key with which the data was encrypted. When resource B receives the data, it uses resource A's public key to decrypt the data. If the data decrypts properly, resource B is certain that only resource A, the sole holder of the corresponding private key, could have encrypted the data. In this way, resource B knows that the data must have originated from resource A, i.e., that the data purportedly from resource A is authentic. In an embodiment of the present invention, the first certificate is sent from the first resource to the second resource in a separate message than the message that includes the device command data.

As used herein, the term "authenticate" means to impart or evaluate authentication information to or in data. Authentication information is useful for determining if the purported source of data is the true source. In accordance with an embodiment of the present invention, when data with no authentication information is received, a default action is taken. In one embodiment of the present invention, the default action is to determine that the data is not authentic and send no response. In another embodiment of the present invention, the message is forwarded to another resource connected to the network for further processing.

In one embodiment of the present invention, the authenticity of the first certificate is established with the assistance of a trusted third party certification authority. A first certificate is created when the first resource selects a first nonce and submits it to the certification authority. A nonce is a data element that for practical purposes is used only once in any given context. In one embodiment of the present invention, a nonce is a random number. The certification authority signs the first nonce with a private asymmetric cryptographic key belonging to the certification authority to produce an authenticated first certificate that is returned to the first resource. In accordance with this embodiment of the present invention, the first nonce along with the first nonce signature data (the authentication information) comprise the first certificate.

In one embodiment, the device command data is authenticated by cryptographically signing it at the first resource using a private asymmetric cryptographic key belonging to the first resource, in known fashion. Device command data can pertain to printing and scanning jobs as well as the location, status, address and/or communication protocol of a network resource, or data stored at a network resource.

In another embodiment of the present invention, the device command message further comprises a time-to-live value. In one embodiment, the time-to-live value is absolute, and specifies a date and time after which the first certificate is invalid. An example of this type of time-to-live value is Sep. 29, 2000:13:27:45. Thus, the first certificate will no longer be valid after one o'clock p.m., twenty seven minutes and forty five seconds on Sep. 29, 2000.

In another embodiment, the time-to-live value is relative and specifies a time which begins to elapse when the first certificate is received. The first certificate is invalid after the time-to-live has elapsed. An example of a relative time-to-live value is 172800 seconds. Thus, the first certificate will no longer be valid two days after it is received. In one embodiment of the present invention, the time-to-live value is authenticated.

In another embodiment, the device command message further comprises at least one flag containing control information. In one embodiment, such control information includes response configuration information. For example, a control flag with a value of 33 indicates that the command response message is to be sent using a particular protocol and formatted such that a certificate follows any response data. In one embodiment of the present invention, the flag is authenticated.

In accordance with one embodiment of the present invention, the authenticity of the certificate in the received device command message is determined by the second resource. In one embodiment of the present invention, the authenticity of the first certificate is determined in known fashion using the public asymmetric cryptographic key belonging to the certification authority and corresponds to the private key used by the certification authority to sign the first nonce.

If the first certificate is determined not to be authentic, then no response is sent to the requesting first resource. This advantageously prevents any further sharing of information with an unauthorized resource, either through open or covert channels. If the first certificate is determined to be authentic, then the authenticity of the device command data is determined by the second resource. In one embodiment of the present invention, the authenticity of the device command data is determined in known fashion using the public asymmetric cryptographic key belonging to the first resource that corresponds to the private key used by the first resource to sign the device command data.

If the device command message is determined not to be authentic, then no response is sent to the requesting first resource. This advantageously prevents any further sharing of information with an unauthorized resource, either through open or covert channels. In accordance with one embodiment of the present invention, the authenticity of a time-to-live value and/or flag is also determined.

If the device command message is determined to be authentic, then the second resource sends a response message to the first resource. The response message can comprise a second certificate and authenticated response data. Response data can include information such as the location, status, address and communication protocol of a network resource; data stored at a network resource; applications and application interface data; and/or any information whose authenticity and/or integrity should be protected.

In one embodiment of the present invention where the response data must be kept private, the response data is encrypted. In one embodiment, the response data is encrypted at the second resource in known fashion using a public asymmetric cryptographic key belonging to the first resource. A recipient of encrypted data decrypts the encrypted data in order to restore the data to its original form before it was encrypted.

In accordance with the present invention, either or both of the time-to-live value and at least one control flag in the device command message can be authenticated. In accordance with one embodiment of the present invention, the authenticity of each such time-to-live value and/or control flag is determined. If any is determined not to be authentic, then no response is sent to the requester. If all are determined to be authentic, then a response message can be sent to the requester.

In another embodiment of the present invention, the response message further comprises a symmetric key that is authenticated and encrypted in known fashion. The symmetric key can advantageously be used to maintain the confidentiality of subsequent communications between the first and second resources. Symmetric key cryptographic algorithms are typically faster and more efficient than asymmetric key cryptographic algorithms, so the confidential transmission of an authentic symmetric key advantageously improves the efficiency and speed of subsequent confidential communications between the first and second resources.

In yet another embodiment, the response message further comprises a time-to-live value for the second certificate. The time-to-live value can be authenticated and/or encrypted in accordance with the present invention. In yet another embodiment, the response message further comprises at least one flag containing control information. The flag can be signed and/or encrypted in accordance with the present invention.

The present invention can advantageously be carried out efficiently in a stateless environment. For example, one embodiment of the present invention is carried out using Internet Protocol, RFC 791, DARPA (Defense Advanced Research Projects Agency) Internet Program Protocol Specification, September 1981. Secure authentication is thus advantageously carried out without having to establish a session between two resources through a network. A session is a persistent connection between communicating resources on a network. This advantageously utilizes the efficiencies available through stateless communication, such as those provided by packet switching. Stateless communication does not require a persistent connection between communicating resources.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for secure operation of a network device, comprising:

(a) assigning a digital certificate to a network user;
(b) receiving a command for operation of a network device and the digital certificate from the network user;
(c) utilizing a cryptographic key stored in the network device to authenticate the digital certificate of the network user;
(d) enabling operation of the network device if the digital certificate of the network user is authenticated and if the operation is permitted by a usage policy associated with the network user; and
wherein the network device is at least one of a printer, a copier, a scanner, and a facsimile machine; and the usage policy associated with the printer, the copier or the facsimile machine is at least one of the policies:
a policy to allow selection of special paper stock, a policy to allow the network device to decrypt and print a document only if the network user was identified by the network device as being physically near the network device, a policy to print a selected watermark when printing the document, a policy to enable the network device to accept digital cash associated with an operation on the document, a policy to enable a billing function, a routing policy, and a policy to escrow a document;
wherein the usage policy associated with the scanner is at least one of the policies:
a policy to enable the network device to accept digital cash associated with an operation on the document, a policy to enable a billing function, a routing policy, and a policy to escrow a document.

2. The method as recited in claim 1, wherein the network user is another network device.

3. The method as recited in claim 1, wherein the command for operation of the network device is encrypted, and wherein the cryptographic key is utilized to decrypt the command for operation.

4. The method as recited in claim 1, further comprising receiving electronic payment for paying for operation of the network device.

5. A computer program embodied on a computer readable medium for secure operation of a network device, comprising:

(a) code segment embodied on the computer readable medium that assigns a digital certificate to a network user;
(b) code segment embodied on the computer readable medium that receives a command for operation of a network device and the digital certificate from the network user;
(c) code segment embodied on the computer readable medium that utilizes a cryptographic key stored in the network device to authenticate the digital certificate of the network user;
(d) code segment embodied on the computer readable medium that enables operation of the network device if the digital certificate of the network user is authenticated and if the operation is permitted by a usage policy associated with the network user; and
wherein the network device is at least one of a printer, a copier, a scanner, and a facsimile machine; and the usage policy associated with the printer, the copier or the facsimile machine is at least one of the policies:
a policy to allow selection of special paper stock, a policy to allow the network device to decrypt and print a document only if the network user was identified by the network device as being physically near the network device, a policy to print a selected watermark when printing the document, a policy to enable the network device to accept digital cash associated with an operation on the document, a policy to enable a billing function, a routing policy, and a policy to escrow a document;

wherein the usage policy associated with the scanner is at least one of the policies:

a policy to enable the network device to accept digital cash associated with an operation on the document, a policy to enable a billing function, a routing policy, and a policy to escrow a document.

6. The computer program as recited in claim 5, wherein the network user is another network device.

7. The computer program as recited in claim 5, wherein the command for operation of the network device is encrypted, and wherein the cryptographic key is utilized to decrypt the command for operation.

8. The computer program as recited in claim 5, further comprising a code segment embodied on the computer readable medium that receives electronic payment for paying for operation of the network device.

9. A system for secure operation of a network device, comprising:

(a) logic that assigns a digital certificate to a network user; and (b) a network device capable of receiving a command for operation thereof and the digital certificate from the network user, wherein the network device utilizes a cryptographic key to authenticate the digital certificate of the network user;

(c) wherein operation of the network device is enabled if the digital certificate of the network user is authenticated and if the operation is permitted by usage policy associated with the network user; and wherein the network device is at least one of a printer, a copier, a scanner, and a facsimile machine; and the usage policy associated with the printer, the copier or the facsimile machine is at least one of the policies:

a policy to allow selection of special paper stock, a policy to allow the network device to decrypt and print a document only if the network user was identified by the network device as being physically near the network device, a policy to print a selected watermark when printing the document, a policy to enable the network device to accept digital cash associated with an operation on the document, a policy to enable a billing function, a routing policy, and a policy to escrow a document;

wherein the usage policy associated with the scanner is at least one of the policies:

a policy to enable the network device to accept digital cash associated with an operation on the document, a policy to enable a billing function, a routing policy, and a policy to escrow a document.

10. The system as recited in claim 9, wherein the network user is another network device.

11. The system as recited in claim 9, wherein the command for operation of the network device is encrypted, and wherein the cryptographic key is utilized to decrypt the command for operation.

12. The system as recited in claim 9, further comprising logic that receives electronic payment for paying for operation of the network device.

13. A method for secure identification of a network device, comprising:

(a) assigning a digital certificate to a network user;

(b) receiving a command for operation of a network device and the digital certificate from the network user;

(c) utilizing a cryptographic key stored in the network device to authenticate the digital certificate of the network user;

(d) enabling operation of the network device if the digital certificate of the network user is authenticated and if the operation is permitted by a usage policy associated with the network user; and wherein the network device is at least one of a printer, a copier, a scanner, and a facsimile machine; and the usage policy associated with the printer, the copier or the facsimile machine is at least one of the policies:

a policy to allow selection of special paper stock, a policy to allow the network device to decrypt and print a document only if the network user was identified by the network device as being physically near the network device; a policy to print a selected watermark when printing the document, a policy to enable the network device to accept digital cash associated with an operation on the document, a policy to enable a billing function, a routing policy, and a policy to escrow a document;

wherein the usage policy associated with the scanner is at least one of the policies:

a policy to enable the network device to accept digital cash associated with an operation on the document, a policy to enable a billing function, a routing policy, and a policy to escrow a document.

14. The method as recited in claim 13, wherein the network user is another network device.

15. The method as recited in claim 13, and further comprising assigning a unique digital certificate to a second network device, wherein the command for operation of the network device is re-routed to the second network device based on at least one of attributes of the network devices and the routing policy.

16. A method for secure management of a network device, comprising:

(a) associating at least on of policy information and a computation protocol with a command for the network device;

(b) encrypting at least one of policy information and computation protocols;

(c) sending at least one of policy information and computation protocols to the network device;

(d) decrypting at least one of policy information and computation, protocols;

(e) processing the command with the network device utilizing at least one of policy information and computation protocols; and wherein the network device is at least one of a printer, a copier, a scanner, and a facsimile machine; and the usage policy associated with the printer, the copier or the facsimile machine is at least one of the policies:

a policy to allow selection of special paper stock, a policy to allow the network device to decrypt and print a document only if the network user was identified by the network device as being physically near the network device, a policy to print a selected watermark when printing the document, a policy to enable the network device to accept digital cash associated with an operation on the document, a policy to enable a billing function, a routing policy, and a policy to escrow a document;

wherein the usage policy associated with the scanner is at least one of the policies:
a policy to enable the network device to accept digital cash associated with an operation on the document, a policy to enable a billing function, a routing policy, and a policy to escrow a document.

* * * * *